United States Patent Office 3,250,736
LATEX MODIFIED CEMENT MORTAR
COMPOSITIONS
Dale S. Gibbs and Lester C. Johnson, Midland, Mich.,
assignors to The Dow Chemical Company, Midland,
Mich., a corporation of Delaware
No Drawing. Filed Mar. 22, 1963, Ser. No. 267,349
6 Claims. (Cl. 260—29.6)

This invention relates to improved latex modified mixtures of cement and aggregate and a process for preparing the same. More particularly, it relates to Portland cement mortar compositions containing highly stable, non-bleeding, aqueous dispersions of certain interpolymers of vinylidene chloride.

In order to improve the flexibility and resistance to chemicals of constructional parts prepared from cement and aggregates and to impart to them high initial mechanical strength, it has been proposed to add plastics, preferably in the form of aqueous dispersions of polymeric materials (commonly known as latexes), to cement mixtures. For this purpose, aqueous dispersions of polymeric materials containing substantial amounts of vinylidene chloride have been found to be highly beneficial.

Prior known vinylidene chloride polymer latexes, however, often contain substantial amounts of undesirable water-soluble material, which results in a lessening of the effectiveness of such latexes. The referred to water soluble material is generally composed of substantial amounts of wetting agents or surfactants and/or water-soluble polymeric materials which are formed during conventionally employed "batch" emulsion polymerization techniques, wherein the latex constituents are initially blended together and subsequently caused to polymerize; or "shot-wise" polymerization techniques, wherein the monomeric constituents of the latexes are added in increments during polymerization.

It has further been found that the prior known vinylidene chloride polymer latexes often are colloidally unstable in cement mortar compositions, and in some instances such cement mortar compositions are characterized by a substantial bleeding of the latex modifier, with resultant losses in desired properties.

Accordingly, it is an object of the present invention to provide cement mortar compositions modified with certain highly stable vinylidene chloride polymer latexes, which compositions have excellent wet bond strength.

Another object of the present invention is to provide such latex modified cement mortar compositions which, after placement and curing, produce excellent dry bond strengths, compressive strengths, tensile strengths, flexural strengths, as well as chemical and solvent resistance.

Still another object of the present invention is to provide such latex modified cement mortar compositions which have the added advantage of the substantial absence of bleeding of the latex modifier from the cement mortar compositions during curing and aging thereof.

The foregoing and related objects are attained by admixing with a mixture of cement, water and aggregate, a stable, aqueous colloidal dispersion comprising (I) a colloidally dispersed, solid, substantially water-insoluble vinylidene chloride interpolymer consisting essentially of (1) at least 50 weight percent vinylidene chloride, (2) from between 5 and 30 weight percent of at least one vinyl ester having the structure

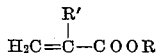

wherein R is an alkyl having from 1 to about 8 carbon atoms, and R' is a radical having from 1 to 3 carbon atoms and hydrogen, (3) between 1 and 15 weight percent of acrylonitrile; and (4) between 0.1 and 5 weight percent of a water-soluble sulfo ester of α-methylene carboxylic acid or its salt having the formula

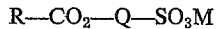

wherein the radical R is selected from the group consisting of vinyl and α-substituted vinyl, and the radical —Q— is a divalent hydrocarbon radical having its valence bonds on different carbon atoms, and M is a cation; the total weight of the polymerizable constituents being 100 percent.

The cement binder referred to may be selected from the group of inorganic stable materials such as hydraulic, Portland or aluminous cement. Conventionally employed cement binders such as gypsum, plaster of Paris, sodium sulfate, lime or a similar calcium binder, or a magnesium oxychloride or other magnesium or magnesite or oxysalt compositions; or any other chemically hardening inorganic substance similar to those set forth above which ordinarily serve as a suitable binder for unmodified concrete and mortar compositions, advantageously may be completely omitted from the latex modified mortar formulations of the present invention. Surprisingly, the omission of such chemically active cement binders has a decidedly beneficial effect on the properties of the latex modified mortars of the present invention, by providing the cured product with maximum physical properties. However, small percentages of these chemically active types of binders may be tolerated with a slight decrease in the best physical properties of the latex modified mortar products of the present invention.

The aggregate used may be stone, gravel, concrete, carborundum, aluminum oxide, emery, marble chips, sawdust, cinders, asbestos, mica, talc, flint or manufactured particles such as powdered ceramic material, or any other material which may serve the purpose of sand. The intended end use of the mortar will serve as a guide to those skilled in the art as to the choice or preferred particle size of the aggregate material to be included in the latex modified mortar of the present invention.

As purely exemplary of the vinyl esters which are useful for the purposes of the present invention are: methyl acrylate, ethyl acrylate, butyl acrylate, hexyl acrylate, 2-ethylhexyl acrylate, and the corresponding methacrylate, ethacrylate and propacrylate derivatives.

The sulfo ester of α-methylene carboxylic acids or salts thereof, as described herein, are those materials as described in the U.S. Patent 2,914,499 issued November 24, 1959, and the U.S. Patent 3,024,221, issued March 6, 1962.

The vinylidene chloride interpolymers useful for the purposes of the present invention are prepared in aqueous medium by the continuous, carefully controlled, addition of the requisite monomeric constituents to an aqueous medium containing catalytic amounts of a substantially non-ionic polymerization catalyst, exemplary of which are hydrogen peroxide and cumene hydroperoxide. In redox polymerization systems the usual ingredients may be used. Small amounts of conventionally used ionic catalysts such as potassium persulfate may also be used; however, best results are generally obtained by the exclusion of such materials. The aqueous medium may additionally contain acids, bases, or salts to provide a desired pH value. Generally, a pH value of about 3.0 to 4.0 is preferred. In the process, it is often preferred to first add a small amount of the essentially water-insoluble monomeric constituent, as defined herein; to the aqueous medium having the desired pH value, followed by the subsequent addition of the necessary polymerization catalyst, to form a polymeric seed particle. When forming such polymeric seed particles by the procedure as described herein, conventional wetting agents such as alkali soap or the like, may be incorporated in the aqueous medium to aid in the attainment of particles of desired size. Generally, particles having an average diameter between about 400 and 2500 angstroms are preferred. The addition of such wetting agents, however, is not critical for the production of the highly stable aqueous colloidal dispersions useful for the purposes of the present invention.

Following the formation of the polymeric seed particles, the remaining essentially water-insoluble monomeric constituents and the required amounts of the sulfo ester are simultaneously and continuously added under carefully controlled conditions to the aqueous medium, to form a polymeric particle having as its outer surface, predominent amounts of the sulfo ester, as defined herein, which is polymerically combined with minor amounts of the essentially water-insoluble monomeric constituent; and wherein essentially all of the sulfo ester is polymerically combined with such essentially water-insoluble constituent.

The aqueous dispersions, as described herein, are subjected to conditions conducive to polymerization of the polymerizable constituents. In most instances, the temperature of the aqueous dispersion is raised, for example, between about 40° C. and 100° C. to activate the polymerization, although, in some instances, particularly those wherein a very active polymerization catalyst is used, the polymerization can occur at temperatures of about 25° C. Other means, such as exposure of the composition to active radiation can be employed to promote polymerization of the monomeric constituents.

The highly stable, aqueous colloidal dispersions useful for the purposes of the present invention are further characterized by the virtual absence of undesirable coagulum (less than about 0.1 weight percent based on the total weight of the polymerizable constituents).

Thus, the aqueous dispersions of polymeric materials, as described herein, combine the highly beneficial properties of: optimum colloidal stability, using only minimum amounts of the herein described copolymerizable water-soluble sulfo esters; reduced viscosities at relatively high polymer solids content; low foaming tendencies; and excellent product uniformity and reproducibility.

Conversely, it has been found that aqueous colloidal dispersions of the polymerizable constituents as described herein, which are prepared by conventionally used "batch" and "shot-wise" polymerization techniques generally contain excessive amounts of undesirable coagulum. That latexes prepared in this manner are less desirable for modification of cement mortar compositions, as compared to the latexes prepared in the manner described herein, is evidenced by the formation of latex modified cement mortar compositions characterized by: a greater tendency for bleeding of the modifying latex from the cement mortar composition; reduced wet and dry bonding, tensile, flexural and compressive strengths; retarded set times; and greater water sensitivity.

As described herein, the aqueous dispersions of the present invention are characteristically very stable, for example, resistance to coagulation of the polymerically dispersed polymer particles. In many instances, the polymer dispersions can be mixed with calcium chloride solutions without causing coagulation of the polymer. The dispersions may also be rigorously agitated without coagulation under conditions that cause substantial precipitation of ordinary dispersions. The optimum stability of the herein defined aqueous dispersions of vinylidene chloride interpolymers, as defined herein, in Portland cement mortar compositions is obtained, however, by the addition to such dispersion, prior to admixture of the same to the cement aggregate, of from between 2 and 8 weight percent, based on the weight of the interpolymer, of a non-ionic wetting agent known to be useful for the colloidal stabilization of such latexes. Illustrative of the non-ionic wetting agents which are advantageously used in the present invention are the oxyalkylated alkyl phenols, such as those formed by the reaction of a dialkylated phenol with ethylene or propylene oxide by procedures well known in the art. As purely exemplary of such compounds is that material comprising the reaction product of 1 mole of ditertiary butyl phenol with 10 moles of ethylene oxide.

It is pointed out that the herein defined amounts of such non-ionic wetting agents in combination with the water-soluble sulfo ester of the present invention is critical to the optimum stability and strength of the cement mortar composition. For example, greater amounts of the herein described sulfo ester will decrease the required levels of non-ionic emulsifier, but, will additionally tend to lower the strength properties, particularly the shear bond strengths of the cement mortar composition.

In accordance with the present invention, the highly stable, aqueous dispersions of interpolymers of vinylidene chloride, as described herein, are admixed with cement mortar, and more particularly Portland cement mortar, in the proportion of from about 5 to about 30 percent by weight of latex solids as based on the dry weight of the Portland cement. Generally, from between 10 to about 60 percent by weight of the interpolymer latex may be added on the basis of the total weight of a wet Portland cement mortar mixture.

After the Portland cement mortar and aqueous dispersion of the interpolymer latex, as described heretofore, have been thoroughly comingled and mixed with the preferred amount of water to the desired smoothness of texture, the same may be subsequently poured into forms, or spread over a surface area and immediately thereafter troweled or smoothed to form a place face. Finally, the mass of latex-modified mortar is allowed to set and harden as chemical hydration occurs.

The following example, wherein all parts and percentages are to be taken by weight, illustrates the present invention but is not to be construed as limiting its scope.

EXAMPLE

A. *Preparation of vinylidene chloride polymer latex.*— Into a polymerization vessel was charged a mixture of 500 grams of deionized water (adjusted to a pH value of 3.0 to 4.0 with hydrochloric acid), 3.5 grams of sodium dodecyl benzene sulfonate (a conventionally used anionic wetting agent) and 0.5 p.p.m. of ferric ammonium sulfate. To this aqueous mixture was subsequently added an initial monomer charge comprising; 44 grams of vinylidene chloride, 3.5 grams ethyl acrylate, 2.5 grams acrylonitrile and 0.5 gram of cumene hydroperoxide. The reaction mixture was then stirred under nitrogen for a period of 10 minutes at a temperature of 25° C., and a solution comprising 0.32 gram of sodium sulfoxylate formaldehyde dissolved in 159.6 grams of deionized water was thereafter added to the reaction mixture at a rate of about 8 grams of the solution per hour, for a period of about 2 hours, to polymerize the initial charge of monomeric materials. Upon completion of polymerization of the initial charge of monomeric materials, a second monomeric mixture comprising 880 grams of vinylidene chloride, 70 grams of ethyl acrylate, and 50 grams of acrylonitrile, and additionally 3.5 grams of cumene hydroperoxide, were added to the polymerization vessel at a rate of 66.6 grams of the mixture per hour for a period of 15 hours. Over the same period of time a solution comprising 10 grams of sodium sulfoethyl methacrylate dissolved in 310 grams of deionized water was separately added to the polymerization vessel at a rate of 21.3 grams of solution per hour. Following the addition of the polymerizable material, the previously described aqueous solution of sodium sulfoxylate formaldehyde was added to the polymerization vessel at a rate of 8 grams of solution per hour for a period of 2 hours to allow completion of polymerization of the monomeric constituents. The resulting polymerization product was a highly stable latex, i.e., aqueous colloidal dispersion containing approximately 48 to 50 percent of a solid vinylidene chloride/ethyl acrylate/acrylonitrile interpolymeric product composed of from about 87 to 88 weight percent vinylidene chloride, about 6 to 7 weight percent ethyl acrylate, about 4 to 5 weight percent acrylonitrile, and about 1.0 weight percent sodium sulfoethyl methacrylate polymerically bound therein, such interpolymers having an average particle size of about 1000 to 1300 angstroms. The aqueous dispersion was found to contain less than about 0.1 weight percent of coagulum based on the weight of the polymerizable constituents, and contained less than about 0.35 weight percent, based on the weight of the polymerizable constituents, of the anionic wetting agent. The latex was additionally found to be extremely colloidally stable to shear, and when aged at 60° C. for a period of two weeks exhibited no evidence of coagulation.

To the so-formed latex was then added about 6.5 weight percent, based on the weight of the polymeric constituent, of a conventionally used non-ionic wetting agent composed essentially of the reaction product of 1 gram mole of ditertiary butyl phenol with 10 gram moles of ethylene oxide.

B. *Preparation and testing of latex modified Portland cement mortar compositions.*—A latex modified cement mortar composition was subsequently prepared by the addition of the hereinafter designated amounts of the above-defined polymeric latex, to the following proportions of materials.

*Formulation I*

| Material: | Parts by weight |
|---|---|
| Sand | 3000 |
| Portland cement | 1000 |
| Vinylidene chloride interpolymer latex containing 50 percent polymer solids | 320 |
| Calcium chloride (20 percent aqueous solution) | 20 |
| Anti-foaming agent of dimethylpolysiloxane/silica aerogel emulsion (10 percent solids) | 12.8 |
| Water | 162.5 |

The sand and Portland cement were thoroughly mixed and the water, aqueous interpolymer latex dispersion, and anti-foaming agent were combined and added to the sand/cement mixture.

The entire formulation was then mixed in a Hobart type mixer until an even consistency resulted (about 4 to 5 minutes). The use of slightly more or less water than indicated may be added to adjust the material to the proper handling consistency. The latex-modified cement formulation was then placed in individual cube-shaped molds and covered with damp cloths for a period of about 24 hours. After the preliminary setting of the mortar, the samples were additionally cured at 100 percent relative humidity at about 25° C. for a period of 3 days. The samples were then permitted to cure and age for 24 days at about 70° F. at a relative humidity of about 50 percent. A portion of the samples were then individually permitted to age while being completely immersed in water for an additional period of 14 days.

Mortar samples prepared from the formulation were then tested for compressive strength in accordance with the procedures as set forth in the A.S.T.M. Test No. C-109-58. The designation "dry" refers to samples that were aged for 24 hours at about 25° C., 3 days at about 25° C. at 100 percent relative humidity as hereinbefore described. The designation "wet" refers to samples which were aged as described above and subsequently, further aged for a period of 14 days while being completely immersed in water.

Each sample was visually rated for evidence of bleeding of the latex-modifier from the mortar during curing and aging. In this regard, none of the mortar samples of the present invention exhibited any observable evidence of bleeding. Absence of latex bleeding is highly desirable for the retention of desirable physical strength properties, such as, shear bond strength, compression strength, tensile strength, fluexural strength, and the like, during extended aging and/or usage of the mortar composition.

The best overall physical properties are obtained at a ratio of about 3 parts of sand to 1 part of cement using a latex solids to cement ratio of about 20 of latex solids to about 100 of cement.

For purposes of comparison, a polymeric latex composed of about 75 weight percent vinylidene chloride, 20 weight percent vinyl chloride, and 5 weight percent ethyl acrylate was prepared using conventional "batch" polymerization techniques, and tested in a Portland cement mortar composition as described previously. This formulation is designated as Formulation II and has the following proportions of materials.

*Formulation II*

| Material: | Parts by weight |
|---|---|
| Sand | 3000 |
| Portland cement | 1000 |
| Interpolymer latex of 75 weight percent vinylidene chloride, 20 weight percent vinyl chloride, 5 weight percent ethyl acrylate (containing 50 percent polymer solids) | 320 |
| Calcium chloride (20 percent aqueous solution) | 20 |
| Anti-foaming agent of dimethylpolysiloxane/silica aerogel emulsion (10 percent solids) | 12.8 |
| Water | 162.5 |

In still another comparison, a comparable, widely used unmodified Portland cement mortar system was tested as described herein. Such composition is designated as Formulation III.

*Formulation III*

| Material: | Parts by weight |
|---|---|
| Sand | 3000 |
| Portland cement | 1000 |
| Calcium chloride (20 percent aqueous solution) | 20 |
| Water | 322.5 |

The following table illustrates: the formulation number; the wet and dry compressive strengths of mortar prepared therefrom, and a visual rating regarding bleeding of the latex from such mortar samples during cure.

TABLE

| Formulation No. | Compressive Strength, p.s.i. | | Latex Bleeding from Mortar Sample |
|---|---|---|---|
| | Dry | Wet | |
| For Comparison: | | | |
| III (Non-modified) | 9,413 | 9,758 | |
| II (Modified with a "batch" polymerized vinylidene chloride polymer latex) | 13,517 | 10,863 | Very noticeable. |
| This Invention: | | | |
| I | 14,083 | 11,200 | None. |

Similar good results are obtained by admixing with a mixture of cement, water and aggregate, any of the stable, aqueous colloidal dispersion as hereinbefore defined.

What is claimed is:
1. In the process of making latex modified cement mortar compositions the improvement consisting of adding to said compositions a stable, aqueous colloidal dispersion of a solid, substantially water-insoluble vinylidene chloride interpolymer consisting essentially of (1) between about 87 and 88 weight percent vinylidene chlo- ride, (2) between about 6 and 7 weight percent of at least one vinyl ester having the structure

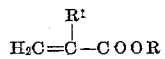

wherein R is alkyl having from 1 to about 8 carbon atoms, and $R^1$ is selected from the group consisting of hydrogen and alkyl having from 1 to 3 carbon atoms, (3) between about 4 and 5 weight percent acrylonitrile, and (4) between about 0.5 and 1.5 weight percent of a water-soluble sulfo-ester having the formula

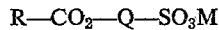

wherein the radical R is selected from the group consisting of vinyl and α-substituted vinyl, and the radical —Q— is a divalent hydrocarbon radical having its valence bonds on different carbon atoms, and M is a cation.

2. The process of claim 1 wherein said interpolymer is present in amounts between about 5 and 30 weight percent based on the weight of the cement.

3. The process of claim 2 wherein said vinyl ester is ethyl acrylate and said water-soluble sulfo-ester is sodium sulfoethyl methacrylate.

4. The process of claim 2 wherein said interpolymer is prepared by continuous polymerization of the polymerizable, monomeric constituents in aqueous dispersion containing catalytic amounts of a substantially non-ionic free radical polymerization catalyst and from about 2 to 8 weight percent, based on the weight of said interpolymer of a non-ionic wetting agent.

5. The process of claim 4 wherein said non-ionic wetting agent is a reaction product of ditertiary butyl phenol and ethylene oxide.

6. The process of claim 5 wherein said wetting agent consists essentially of about 1 gram mole of ditertiary butyl phenol and about 10 gram moles of ethylene oxide.

References Cited by the Examiner

UNITED STATES PATENTS 2,914,499  11/1959  Sheetz _____ 260—29.6

FOREIGN PATENTS 1,269,384  7/1961  France.

MURRAY TILLMAN, *Primary Examiner.*

SAMUEL H. BLECH, *Examiner.*

N. F. OBLON, *Assistant Examiner.*